United States Patent [19]

Frano

[11] 4,293,261
[45] Oct. 6, 1981

[54] REINFORCING SEALING SHEET METAL FASTENER ANCHOR

[75] Inventor: Francis G. Frano, Hoffman Estates, Ill.

[73] Assignee: Illinois Tool Works Inc., Chicago, Ill.

[21] Appl. No.: 95,288

[22] Filed: Nov. 19, 1979

[51] Int. Cl.³ .............................................. F16B 37/04
[52] U.S. Cl. .................................. 411/85; 24/221 A; 411/437
[58] Field of Search ............................ 151/41.7, 41.71; 85/32 V, 32 R, 36, 5 P; 24/221 A, 221 K, 221 R; 411/85, 437

[56] References Cited

U.S. PATENT DOCUMENTS

| | | | |
|---|---|---|---|
| 2,157,641 | 5/1939 | Tinnerman | 85/32 V X |
| 2,515,510 | 7/1950 | Griffin | 24/221 A |
| 2,608,735 | 9/1952 | Bupitch | 24/221 A |
| 3,298,271 | 1/1967 | Krueger | 85/32 R |
| 3,802,476 | 4/1974 | Hoadley | 85/32 V X |
| 3,861,004 | 1/1975 | Schenk | 24/221 A X |

Primary Examiner—Ramon S. Britts
Attorney, Agent, or Firm—J. R. Halvorsen; T. W. Buckman

[57] ABSTRACT

A reinforcing sealing sheet metal fastener anchor for use with at least two fasteners mounted in a multi-apertured thin work panel. The anchor includes at least two fastener accepting apertures located in a planar base and a plurality of locating tabs extending outwardly from said base through a continuous double-faced pressure sensitive tape for positively locating and orientating the anchor relative to the work panel by engaging the margins of at least two different aligned workpiece apertures which are sealed by the tape.

9 Claims, 9 Drawing Figures

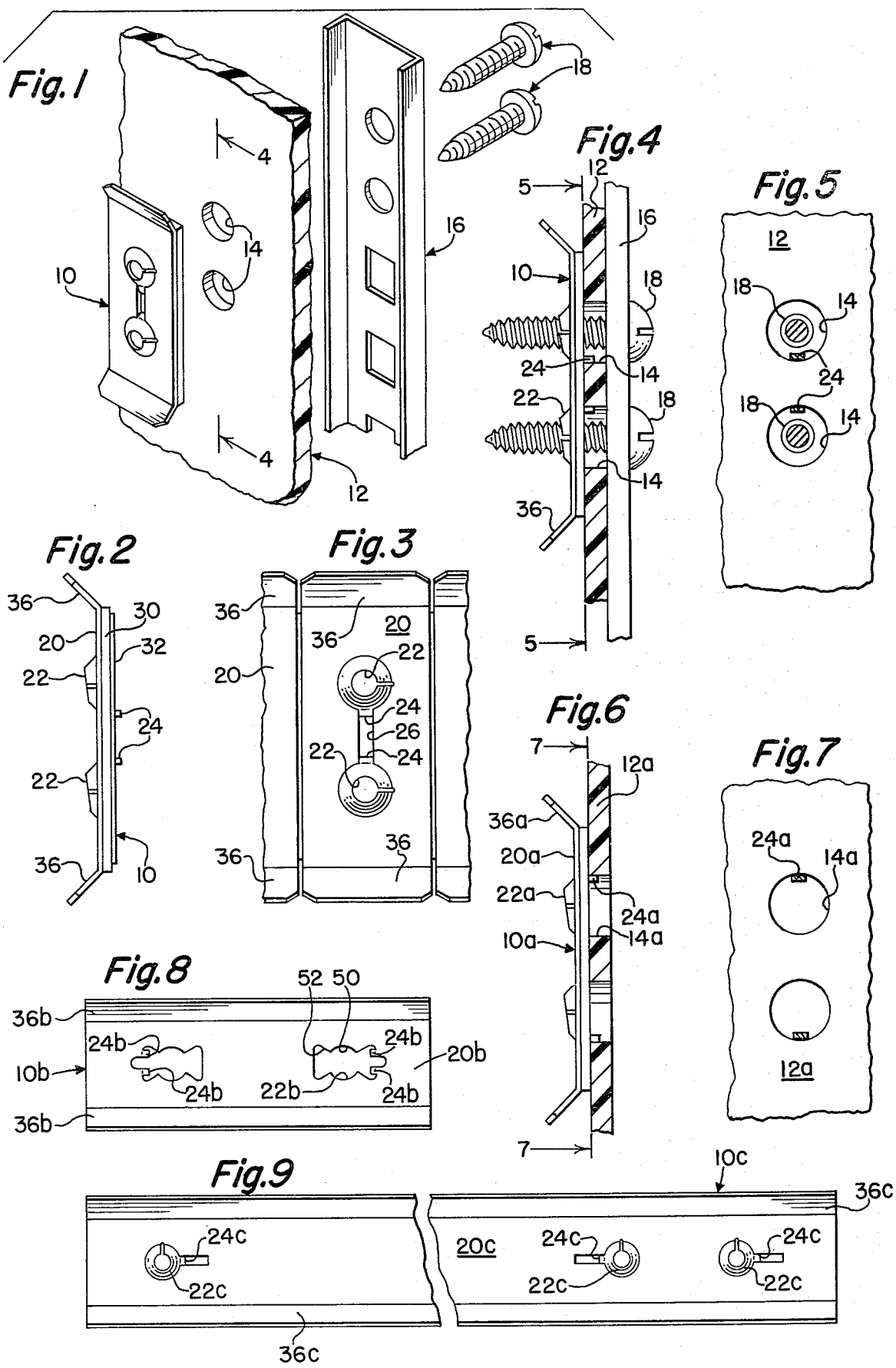

REINFORCING SEALING SHEET METAL FASTENER ANCHOR

BACKGROUND OF THE INVENTION

This invention is concerned with the provision of a fastener anchoring device to be pre-assembled with a wall panel having a plurality of apertures for subsequent reception of a plurality of fasteners which are received through the apertures for mounting any one of a variety of components to be exposed side of the wall surface in the finished structure which, for example, may be a refrigerator in which the apertured wall constitutes the liner wall attached to an outer cabinet wall structure with the space between the walls filled with an insulating material which may be foamed in citu. Devices of this type can be found in U.S. Classes 151/41.7 and 85/32 and more specifically relates generally to devices of the type shown in U.S. Pat. No. 3,802,476, issued Apr. 9, 1974 in the name of John E. Hoadley and assigned to the common assignee of the present invention; and also relates generally to the fastener shown in U.S. Pat. No. 3,298,271, issued Jan. 17, 1967 in the name of C. E. Krueger. Both of these latter devices were adapted for use in a single aperture or slot, respectively, and lacked means for specific orientation, as opposed to simple location.

SUMMARY OF THE INVENTION

The present invention relates to a one piece sheet metal fastener anchor having a plurality of fastener receiving apertures therein and having means which readily orient the fastener anchor relative to a plurality of apertures at least equal in number to the fastener receiving apertures in the anchor. In this invention, a plurality of tabs are utilized, at least two in number, which have a predetermined spacing for engaging in-line edges of the different apertures in the work panel which thereby orients and locates the fastener anchor to locate the fastener receiving apertures coaxially relative to the panel apertures.

Thus, an object of the present invention is to provide a simplistic economically producible reinforcing sealing fastener anchor including a sheet metal planar portion carrying the fastener receiving apertures and a plurality of tabs struck from within the margins of said base portion and extending in one direction therefrom. Additionally, the fastener anchor includes a two-faced foamed tape adhesive member which is pierced by the locating tabs and engages one surface of the fastener anchor and will engage and retain the fastener anchor relative to the workpiece, after a facing paper is removed from the second surface of the tape. At least one wing element extends in the opposite direction from said tabs and tape for use in gripping the fastener during its application to the workpiece and serves the secondary function of assisting in prevention of rotation by embedment in the foamed insulation material when used with a refrigerator liner.

A further object of the present invention is to provide an economical fastener which can be readily applied to a workpiece and thereby reduce the labor expense of installation.

Other objects will be apparent to those skilled in the art when the specification is read in conjunction with the attached drawings.

BRIEF DESCRIPTION OF THE DRAWINGS

FIG. 1 is an exploded perspective view in partial section showing an embodiment of the present invention in conjunction with a work panel, a secondary channel member which can be used in that environment and a pair of fasteners, i.e. screws;

FIG. 2 is a side view in elevation of the embodiment shown in FIG. 1;

FIG. 3 is a plan view of a plurality of fasteners in fragmented section as applied to a strip of tape;

FIG. 4 is a side elevational view in partial section showing an embodiment of the present invention, of the type shown in FIG. 1, in assembled relationship;

FIG. 5 is a sectional view taken along line 5—5;

FIG. 6 is a side elevational view in partial section of a secondary embodiment of the present invention as applied to a work panel;

FIG. 7 is a partial sectional view taken along line 7—7 of FIG. 6;

FIG. 8 is a plan view of a third embodiment of the present invention; and

FIG. 9 is a further embodiment of the present invention.

DETAILED DESCRIPTION

Referring now to the drawing wherein similar parts are designated by similar numerals, a fastener anchor 10, as shown in FIGS. 1-5, is associated with a work panel 12 having a plurality of apertures 14 spaced a predetermined distance apart, with the work panel 12 supporting a member 16 by a plurality of fasteners 18. As best seen in FIGS. 2-4 the fastener anchor 10 includes a generally planar base portion 20 having at least two fastener receiving apertures 22 with the center line of the fastener receiving apertures 22 being spaced apart the same predetermined distance as apertures 14 for a particular application. In the present embodiment, the fastener receiving apertures 22 are dimpled around said aperture to provide a helical impression since in the present embodiment the fastener to be received therein is a screw threaded member. Extending downwardly from one side of the plane of base 20 are a pair of locating tabs 24 which are sheared from within the margins of base 20 and spaced apart a distance substantially equal to the distance between adjacent edges of the apertures 14 and adapted to grip the margins of said apertures 14 and thereby positively locate the fastener receiving apertures 22 coaxially relative to panel apertures 14 when the fastener is applied to the panel 12.

The fastener anchor 10 also includes a foamed double-face adhesive tape 30 which initially includes a backing or strip off paper covering 32. Tape 30 is substantially continuous and imperforate when it is applied to the substantial portion of base 20 and is pierced by the tabs 24 and is of such an area as will cover and seal the fastener receiving apertures 22, the opening 26 from which the tabs 24 are struck as well as being large enough to cover and seal the panel apertures 14 when the fastener anchor 10 is applied to the panel 12.

At least one wing element 36 is provided and extends angularly away from base 20 in a direction opposite to the direction of the tabs 24. The wings 36 may be formed along the edge of the fastener base 20, as shown in the present embodiment, or may be struck from within the margins of the base 20. In the present embodiment, two such wings are provided. The wings 36 provide a means for grasping the fastener anchor to apply it to the panel 12 and also may be embedded in the foamed insulation material referred to hereinabove which assists in retaining the fastener anchor against rotational and other forces that the anchor is subjected to when the fasteners are inserted in the fastener receiving apertures.

To install the fastener 10 the backing paper 32 is stripped off of the double-faced adhesive tape 30. The locating tabs 24 are caused to enter the spaced apertures 14 and grip or engage the adjacent edges of the apertures 14 thereby positively locating the fastener receiving apertures 22 relative to the apertures 14. The tape 30 seals the apertures 14 as well as the fastener receiving apertures 22, permits the secondary articles 16, shown as an elongated channel member in FIG. 1 which is used as a support for cantilever shelves in a typical refrigerator installation, after the screws 18 have penetrated the appropriate apertures of article 16, apertures 14 and accepted within the fastener receiving apertures 22.

Referring now to FIGS. 6 and 7 wherein similar parts of the secondary embodiment are designated by similar numerals with the addition of the suffix "a", we find that this fastener is substantially identical to the first embodiment with the exception that the locating tabs 24a are struck from the base 20a and disposed on opposite sides of the fastener receiving apertures 22a. Thus, when this fastener anchor 10a is applied to the work structure 12a the tabs 24a engage the remote edges of the apertures 14a, as opposed to the adjacent edges as was shown in the first embodiment.

Referring now to FIG. 8 wherein a third embodiment is disclosed, wherein similar parts are designated by similar numerals with the addition of the suffix "b", this embodiment includes an elongated base portion 20b having a pair of fastener receiving apertures 22b that are spaced a predetermined distance in the same fashion as the earlier embodiments. The fastener receiving aperture in this embodiment takes the form of a double key hole slot having a central circular portion 50 and a pair of tapered end portions 52 that give a generally "bow-tie" configuration. Such a fastener receiving aperture is adapted to accept fasteners of the type shown in U.S. Pat. Nos. 2,608,735 and 2,620,538 both of which are assigned to the common assignee of the present invention. In this embodiment the locating tabs 24b are struck from within margins of the aperture forming the fastener receiving aperture and are two in number, in this embodiment, and are adapted to engage complementary apertures, not shown, of the general configuration shown as the fastener receiving apertures 22b. An additional difference in this embodiment from the previous embodiments, is the fact that the wing elements 36b are disposed along the side or longitudinal edges of the base 20b, as opposed to the ends or narrow portion thereof, in the previous embodiments. Either disposition of the wings 36 or 36b is acceptable. Additionally, as was previously mentioned, the wing can be struck from within the base 20 or 20b and will serve the same function.

The last embodiment is disclosed in FIG. 9, wherein similar parts are designated by similar numerals with the addition of the suffix "c". In some work applications it is necessary to provide an extremely long fastener anchor and similarly it is possible to have a wide diversity of hole spacing in the workpiece. In this embodiment 10c, the base 20c is of an elongated narrow flat configuration and has a plurality of fastener receiving apertures 22c as well as a like number of locating tabs 24c. In a fastener anchor of this type where there is a multiplicity of locating tabs 24c it will be recognized that any given pair of tabs 24c may grip the adjacent edges or the opposite edges of a pair of apertures in the workpiece. For convenience sake, the wings 36c extend along the longitudinal edge of the base 20c but it will be recognized that a plurality of struck out wings or foreshortened lengths of the wings may be utilized.

This invention, as described hereinabove, clearly spells out a novel means of positive location in a particular orientation of a fastener relative to a plurality of workpiece apertures. The previous approaches to this invention were acceptable wherein a single fastener was being utilized with a single workpiece aperture, however where a multiplicity of apertures is utilized it is necessary to positively orient the fastener anchor 10 as well to merely locate it. The disposition of a single tab in any given aperture or a plurality of tabs has been disclosed and any combination thereof is acceptable to the present invention as long as the locating tabs 24 not only locate but also orient the fastener anchor relative to the plurality of apertures.

What is claimed is:

1. A reinforcing sealing system for use with at least two fasteners mounted in a multi-apertured thin work panel, including in combination a work panel having at least two through apertures spaced a predetermined distance, a sheet metal fastener anchor having a generally planar base, a plurality of fastener accepting apertures in said base equal in number to said work panel apertures and spaced apart said predetermined distance, gripping means extending in a first direction upwardly beyond one surface of the plane of said base, locating means comprising at least two tabs struck from within the margins of and extending generally normally to said base in a second opposite direction downwardly beyond a second surface of the plane of said base opposite said gripping means, said locating means being positioned in spaced relation to one another with only one of said tabs being positioned adjacent to each one of said spaced fastener accepting apertures and thereby adapted to engage the margins of said at least two spaced work panel apertures and positively locate and orient said anchor fastener accepting apertures relative to said at least two work panel apertures, and continuous initially imperforate double-faced adhesive tape having one face thereof covering a substantial portion of the second surface of said base, said tape adapted to cover and seal both of said work panel and fastener accepting apertures, said spaced tabs piercing said tape and extending outwardly beyond the second face of said tape to permit blind locating and orientation of said fastener anchor apertures relative to said work panel apertures.

2. A fastener anchor of the type claimed in claim 1 wherein said base is generally rectangular in plan configuration.

3. A fastener anchor of the type claimed in claim 2 wherein said fastener accepting apertures are screw receiving impressions.

4. A fastener anchor of the type claimed in claim 3 wherein said screw receiving impressions include a helix configuration.

5. A fastener anchor of the type claimed in claim 1 wherein said tabs are located generally between at least two of said fastener accepting apertures of said tabs engaging the adjacent edges of two of said panel apertures.

6. A fastener anchor of the type claimed in claim 1 wherein said tabs are located generally on remote oppositely facing margins of said fastener accepting apertures and said tabs engaging the remote edges of two of said panel apertures.

7. A fastener anchor of the type claimed in claim 1 wherein said gripping means includes at least one wing member extending angularly from the plane of said base.

8. A fastener anchor of the type claimed in claim 7 wherein said at least one wing member includes two wing members extending angularly from opposite edges of said base.

9. A fastener anchor of the type claimed in claim 2 wherein said fastener accepting apertures each includes a central generally circular opening and a pair of generally circular openings and a pair of generally polygonal openings extending in opposite directions from said central opening to form a butterfly-shaped opening to accept a quarter-turn stud with spring-like engaging arms.

* * * * *